(12) United States Patent
Gandhi et al.

(10) Patent No.: US 12,716,401 B2
(45) Date of Patent: Aug. 25, 2026

(54) ELASTOMER SKINS WITH EMBEDDED AND UNEQUALLY PRE-LOADED COATED ACTUATORS

(71) Applicant: Toyota Motor Engineering & Manufacturing North America, Inc., Plano, TX (US)

(72) Inventors: Umesh N. Gandhi, Farmington Hills, MI (US); Yuyang Song, Ann Arbor, MI (US); Pawandeep Singh Matharu, Charlottesville, VA (US); Yonas Tadesse, Garland, TX (US)

(73) Assignees: Toyota Motor Engineerring & Manufacturing North America, Inc., Plano, TX (US); Toyota Jidosha Kabushiki Kaisha, Toyota (JP); Board of Regents, The University of Texas System, Austin, TX (US)

( * ) Notice: Subject to any disclaimer, the term of this patent is extended or adjusted under 35 U.S.C. 154(b) by 248 days.

(21) Appl. No.: 18/747,736

(22) Filed: Jun. 19, 2024

(65) Prior Publication Data

US 2026/0043391 A1 Feb. 12, 2026

(51) Int. Cl.
*F03G 7/06* (2006.01)

(52) U.S. Cl.
CPC ........ *F03G 7/06114* (2021.08); *F03G 7/0616* (2021.08); *F03G 7/062* (2021.08);
(Continued)

(58) Field of Classification Search
CPC .... F03G 7/06114; F03G 7/0616; F03G 7/062; F03G 7/0636; F03G 7/064; F03G 7/0612;
(Continued)

(56) References Cited

U.S. PATENT DOCUMENTS

| | | | |
|---|---|---|---|
| 10,480,491 | B2 | 11/2019 | Li et al. |
| 11,143,169 | B2 | 10/2021 | Li et al. |

(Continued)

OTHER PUBLICATIONS

Almubarak, Y., Tadesse, Y. Twisted and coiled polymer (TCP) muscles embedded in silicone elastomer for use in soft robot. Int J Intell Robot Appl 1, 352-368 (2017). https://doi.org/10.1007/s41315-017-0022-x.*

(Continued)

*Primary Examiner* — Matthew T Largi
(74) *Attorney, Agent, or Firm* — Christopher G. Darrow; Darrow Mustafa PC

(57) ABSTRACT

An actuator described herein triggers twisting actuation of an elastomer skin. In one embodiment, an elastomer skin includes an elastomer substrate and a set of coated twisted and coiled polymer fishing line and resistance heating wire ($TCP_{FL}^{RHW}$) actuators embedded in the elastomer substrate. The coated $TCP_{FL}^{RHW}$ actuators are unequally pre-loaded. A coating of the coated $TCP_{FL}^{RHW}$ actuators includes a mixture of carbon nanotubes, metal nanoparticles, and mesoporous carbon nanoparticles.

20 Claims, 11 Drawing Sheets

(52) U.S. Cl.
CPC .......... *F03G 7/0636* (2021.08); *F03G 7/064* (2021.08); *F05B 2280/2006* (2013.01); *F05B 2280/4003* (2013.01); *F05B 2280/6011* (2013.01)

(58) Field of Classification Search
CPC ...... F05B 2280/2006; F05B 2280/4003; F05B 2280/6011
See application file for complete search history.

(56) References Cited

U.S. PATENT DOCUMENTS

| | | | | |
|---|---|---|---|---|
| 11,149,720 | B2 | 10/2021 | Li et al. | |
| 11,629,705 | B2 | 4/2023 | Li et al. | |
| 11,746,760 | B2 * | 9/2023 | Lima | F03G 7/06 700/28 |
| 12,510,062 | B2 * | 12/2025 | Song | F03G 7/0616 |
| 2013/0281291 | A1 * | 10/2013 | Pak | H01M 4/92 252/502 |
| 2015/0152852 | A1 * | 6/2015 | Li | H02N 11/006 60/527 |
| 2018/0058480 | A1 * | 3/2018 | Asai | B25J 9/142 |
| 2019/0307919 | A1 * | 10/2019 | Lima | A61L 27/34 |
| 2020/0347525 | A1 * | 11/2020 | Kaneko | D03D 9/00 |
| 2022/0260062 | A1 | 8/2022 | Li et al. | |
| 2023/0078643 | A1 * | 3/2023 | Kongahage | A61F 2/50 623/14.13 |
| 2024/0271338 | A1 * | 8/2024 | Witham | D04C 1/12 |
| 2025/0083306 | A1 * | 3/2025 | Matharu | A61K 9/00 |
| 2025/0153639 | A1 * | 5/2025 | Matharu | C08K 3/04 |
| 2025/0162482 | A1 * | 5/2025 | Matharu | D02G 3/36 |

OTHER PUBLICATIONS

Armita Hamidi et al (2020) Smart Mater. Struct. 29 045039.*
U.S. Appl. No. 18/458,514, filed Aug. 30, 2023.
Matharu et al. “Single layered soft skin actuated with twisted and mandrel coiled actuators for soft robotics.” Journal of Polymer Science. Feb. 20, 2024.
Chossat et al. “Soft wearable skin-stretch device for haptic feedback using twisted and coiled polymer actuators.” IEEE Transactions on Haptics. vol. 12 issue 4. 2019.
Almubarak et al. “Twisted and coiled polymer (TCP) muscles embedded in silicone elastomer for use in soft robot.” International Journal of Intelligent Robotics and Applications. vol. 1, p. 352-368. 2017.
Sun et al. “Embedded and Controllable Shape Morphing with Twisted-and-Coiled Actuators.” 2018 IEEE/RSJ International Conference on Intelligent Robots and Systems (IROS). 2018.
Tomar et al. “Multi-layer robot skin with embedded sensors and muscles.” Electroactive Polymer Actuators and Devices (EAPAD) 2016. vol. 9798. 2016.
Matharu et al. “SoJel-A 3D printed jellyfish-like robot using soft materials for underwater applications.” Ocean Engineering, vol. 279. 2023.
Gong et al. “A bionic soft tongue driven by shape memory alloy and pneumatics.” Bioinspiration & Biomimetics. vol. 16, issue 5. Aug. 2021.
Besse et al. “Flexible active skin: large reconfigurable arrays of individually addressed shape memory polymer actuators.” Advanced Materials Technologies, vol. 2 issue 10. Oct. 2017.
Fei et al. “Cephalopod-Inspired Stretchable Self-Morphing Skin via Embedded Printing and Twisted Spiral Artificial Muscles.” Advanced Functional Materials, vol. 31 issue 46. Sep. 2021.
Kotak et al. “Bioinspired Fouling-Release Smart Skin Powered by Twisted Spiral Artificial Muscles (TSAMs).” Advanced Materials Technologies, vol. 8 issue 4. Dec. 2022.
Almubarak et al. “Kraken: a wirelessly controlled octopus-like hybrid robot utilizing stepper motors and fishing line artificial muscle for grasping underwater.” International Journal of Intelligent Robotics and Applications, vol. 6, p. 543-563. Feb. 2022.
SMOOTH-ON. “Ecoflex 00-10 Product Information | Smooth-On, Inc.” Retrieved from the Internet: <https://www.smooth-on.com/products/ecoflex-00-10/>, Retrieved May 14, 2024.
Almubarak et al. “Fully embedded actuators in elastomeric skin for use in humanoid robots.” Electroactive Polymer Actuators and Devices (EAPAD) XX. Mar. 2018.
Hamidi et al. “Poly-Saora robotic jellyfish: Swimming underwater by twisted and coiled polymer actuators.” Smart Materials and Structures, vol. 29 issue 4. Mar. 2020.
Vivek Jitendra Panchal. “Qadralimb: Embedded TCP Actuators in Silicone for Grasping Tasks and Underwater Soft Robots.” The University of Texas at Dallas, 2020.
Wu et al. “A Novel Soft Actuator for the Musculoskeletal System.” Advanced Materials Technologies, vol. 3 issue 5. Feb. 2018.
Haines et al. “Artificial Muscles from Fishing Line and Sewing Thread.” Science, vol. 343, issue 6173. pp. 868-872. Feb. 2014.
Piao et al. “Enhanced dynamic performance of twisted and coiled soft actuators using graphene coating.” Composites Part B: Engineering, vol. 178. Dec. 2019.
Higueras-Ruiz et al. “Cavatappi artificial muscles from drawing, twisting, and coiling polymer tubes.” Science Robotics, vol. 6 issue 53. Apr. 2021.
Cherubini et al. “Experimental characterization of thermally-activated artificial muscles based on coiled nylon fishing lines.” AIP Advances 5. Jun. 2015.
Huber et al. “The selection of mechanical actuators based on performance indices.” Proceedings of the Royal Society of London. Series A: Mathematical, physical and engineering sciences. vol. 453, issue 1965. Oct. 1997.
Hamidi et al. “Multidirectional 3D-printed functionally graded modular joint actuated by TCPFL muscles for soft robots.” Bio-Design and Manufacturing, vol. 2. pp 256-268. Nov. 2019.
Wu et al. “A reconfigurable robot with tensegrity structure using nylon artificial muscle.” Active and Passive Smart Structures and Integrated Systems 2016. vol. 9799. Apr. 2016.
Mu et al. “Sheath-run artificial muscles.” Science, vol. 365, issue 6449. Jul. 2019.
Mirvakili et al. Simple and Strong: Twisted Silver Painted Nylon Artificial Muscle ActuatedElectroactive Polymer Actuators and Devices (EAPAD) 2014. vol. 9056. Mar. 2014.

* cited by examiner 440
102
104-3
104-2
104-1

440
102
104-3
104-2
104-1

440
102

1060

CNT-C-Ni-PVA Coated Mandrel Coiled $TCP_{FL}$

Non-Coated Mandrel Coiled $TCP_{FL}$

Actuation Strain/Cycle (%)

50

30

10

0

0 0.025 0.05 0.1 0.5 1

Frequency (Hz)

ELASTOMER SKINS WITH EMBEDDED AND UNEQUALLY PRE-LOADED COATED ACTUATORS

TECHNICAL FIELD

The subject matter described herein relates, in general, to soft robotic elastomer skins and, more particularly, to elastomer skins with embedded twisted and coiled polymer (TCP) actuators that are 1) coated and 2) unequally pre-loaded to effectuate a twisting actuation of the elastomer skin.

BACKGROUND

Soft robotics is a field wherein the movement of the robotic elements relies on compliant materials rather than rigid links. Artificial muscles are one class of soft robotics where a soft robotic device mimics an animal or human muscle. An artificial muscle may change its stiffness, reversibly contract, expand, or rotate when an activation energy (e.g., voltage, current, pressure, or temperature) is received. Soft robots with biomimetic or compliant actuation may be used in various industries, such as soft robotics, bionics, biology, medicine, and smart wearable clothing.

SUMMARY

In one embodiment, example elastomer skins exhibit twisting actuation from coated TCP actuators embedded within the elastomer skin. The elastomer skin includes 1) an elastomer substrate and 2) a set of coated twisted and coiled polymer fishing line and resistance heating wire ($TCP_{FL}^{RHW}$) actuators embedded in the elastomer substrate. The coated $TCP_{FL}^{RHW}$ actuators are unequally pre-loaded. The coating of the coated $TCP_{FL}^{RHW}$ actuators includes a mixture of carbon nanotubes, metal nanoparticles, and mesoporous carbon nanoparticles.

In another embodiment, an elastomer skin includes 1) an elastomer substrate and 2) a set of coated twisted and coiled polymer fishing line and resistance heating wire ($TCP_{FL}^{RHW}$) actuators embedded in the elastomer substrate. The coated $TCP_{FL}^{RHW}$ actuators are unequally pre-loaded. The coating of the coated $TCP_{FL}^{RHW}$ actuators includes a mixture of carbon nanotubes, metal nanoparticles, and mesoporous carbon nanoparticles dispersed within a polymer matrix.

In another embodiment, an elastomer skin includes 1) an elastomer substrate and 2) a set of coated twisted and coiled polymer fishing line and resistance heating wire ($TCP_{FL}^{RHW}$) actuators embedded in the elastomer substrate. The coated $TCP_{FL}^{RHW}$ actuators are unequally pre-loaded. The coating of the coated $TCP_{FL}^{RHW}$ actuators includes a mixture of carbon nanotubes, metal nanoparticles, and mesoporous carbon nanoparticles dispersed within a polymer matrix. The composition of the coating is between 5.0 wt. % and 15.0 wt. % carbon nanotubes, between 5.0 wt. % and 15.0 wt. % metal nanoparticles, between 30.0 wt. % and 50.0 wt. % mesoporous carbon nanoparticles, and between 30.0 wt. % and 50.0 wt. % polymer matrix.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
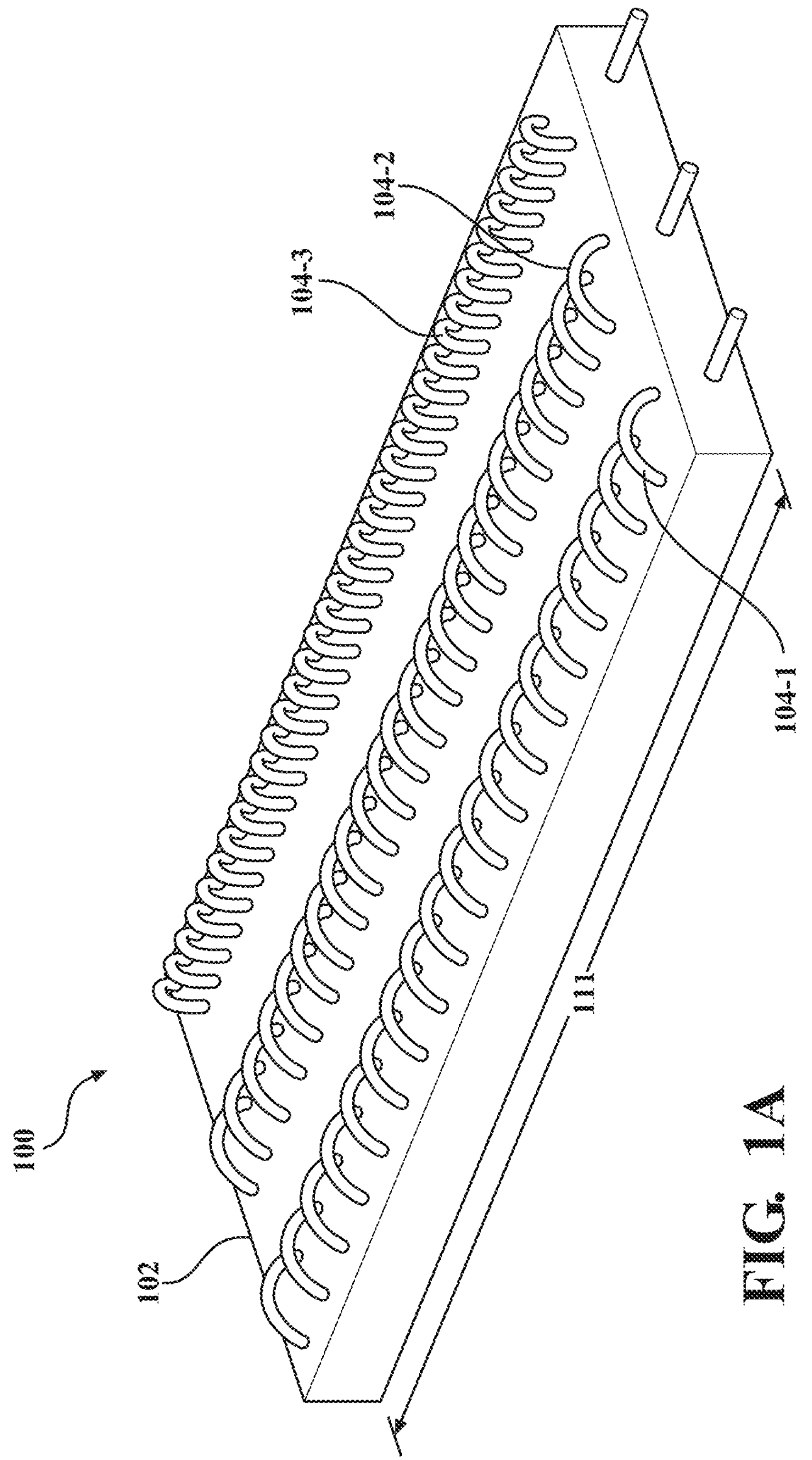
FIGS. 1A-1C illustrate an elastomer skin with embedded unequally pre-loaded and coated $TCP_{FL}^{RHW}$ actuators.

Elastomer skins with improved dynamics, including controllable and programmable twisting and squeezing motions are described herein. Electrical motors and fluidic actuators operate well in many tasks, yet their rigid structure and complexity negatively impact their use in certain fields such as biomimetics, bionics, biology, and medicine, among others. Moreover, linkage-based devices may not align with certain environmental and applicational constraints. For example, linkage-based devices may malfunction in underwater applications, have limited degrees of freedom of movement, and/or be impractical when space is limited.

The popularity of soft robotic devices is rising as a potential replacement for linkage/joint robots in certain applications due to their greater functionality and flexibility. Soft robotic devices, which rely on compliant materials to generate motion, offer an exciting alternative to linkage-based devices in these applications and may facilitate new robotic operations in existing or unserved fields. For example, soft robotic devices may be more readily miniaturized for small-scale applications, whereas it may be difficult to miniaturize link and joint-based robotic devices. As another example, soft robotics may be able to generate complex movements with a simple structure.

In one example, a soft robotic device may include a muscle-like actuator, such as a twisted and coiled polymer (TCP) actuator. A TCP actuator is a strand of polymer that has been twisted and coiled under load to produce spring-like structures. TCP actuators exhibit negative thermal expansion through joule heating via a resistance heating wire that receives activation energy. TCP actuators provide reversible expansion and contraction. Accordingly, TCP actuators have been proposed as artificial muscles for use in soft robotics, bionic devices, biology, medicine, and smart wearable clothing. However, current TCP actuators require more power than desired, exhibit a large hysteresis effect, are complex to manufacture, and are particularly inefficient when used in water due to increased heat loss during operation.

The present disclosure addresses these issues with TCP actuators and other issues related to TCP actuators. Specifically, the present specification describes an elastomeric skin that exhibits complex, muscle-like movements such as grasping and twisting. As a specific example, an elastomer skin of the present specification may be able to grasp and expel fluid from a tube, such as toothpaste from a toothpaste tube.

Specifically, the present specification describes a single-layered soft skin with a set of embedded $TCP_{FL}^{RHW}$ actuators that are unequally pre-loaded. Being unequally pre-loaded, each of the embedded $TCP_{FL}^{RHW}$ actuators responds differently to a particular activation energy. For example, a first $TCP_{FL}^{RHW}$ actuator that has particular pre-loading characteristics may, for a given activation energy, bend with a certain radius of curvature. A second $TCP_{FL}^{RHW}$ actuator with different pre-loading characteristics may bend with a different radius of curvature for the same activation energy. Given that all the $TCP_{FL}^{RHW}$ actuators are embedded in the same elastomer substrate, the substrate exhibits a twisting motion as portions of the elastomer substrate that are adjacent to individually pre-loaded $TCP_{FL}^{RHW}$ actuators have different radiuses of curvature. The elastomer skin can be used in various applications based on this unique twisting motion. As a particular example, the elastomer skin may be used for soft squeezing applications, such as a soft gripper in a hand robot and other applications where it is desirable for the elastomeric structure to bend and twist. An example of the twisting motion is depicted below in connection with FIGS. 2A and 2C.

In an example, the actuators are coated TCP fishing lines and resistance heating wire ($TCP_{FL}^{RHW}$) actuators. In some variations, the $TCP_{FL}^{RHW}$ actuators include a twisted and coiled polymer fishing line ($TCP_{FL}$) with a resistance heating wire coiled with the $TCP_{FL}$. The $TCP_{FL}^{RHW}$ actuators also include a coating, which is a mixture of carbon nanotubes, metal nanoparticles, and mesoporous carbon nanoparticles. The coating has a heat transfer coefficient that is greater than the heat transfer coefficient for the $TCP_{FL}$. Due to this improved thermal conductivity, the dynamic actuation of these coated $TCP_{FL}^{RHW}$ actuators may be better than those of non-coated $TCP_{FL}^{RHW}$ actuators. That is, heating and cooling the coated $TCP_{FL}^{RHW}$ actuators to generate movement requires less energy (power) than actuating similar movement of an uncoated $TCP_{FL}^{RHW}$ actuator. In some variations, the coating is hydrophobic such that coated $TCP_{FL}^{RHW}$ are effectively shielded from water and do not exhibit the rate of heat loss exhibited by an uncoated $TCP_{FL}^{RHW}$ actuator.

In this way, the disclosed elastomer skins provide reversible bending and twisting movements by including unequally pre-loaded $TCP_{FL}^{RHW}$ actuators. The embedment of unequally pre-loaded carbon nanotube-metal-mesoporous carbon (CNT-M-C)-coated $TCP_{FL}^{RHW}$ actuators enhances the performance of these elastomer skins with regards to dynamic actuation and power draw. Moreover, these elastomer skins have high elongation, are safe for human interaction, and are simple to manufacture. If assembled in a circular gripper, such as a hand robot, this soft elastomeric skin can grasp different objects of various sizes and shapes.

Figures 1B, 1C:
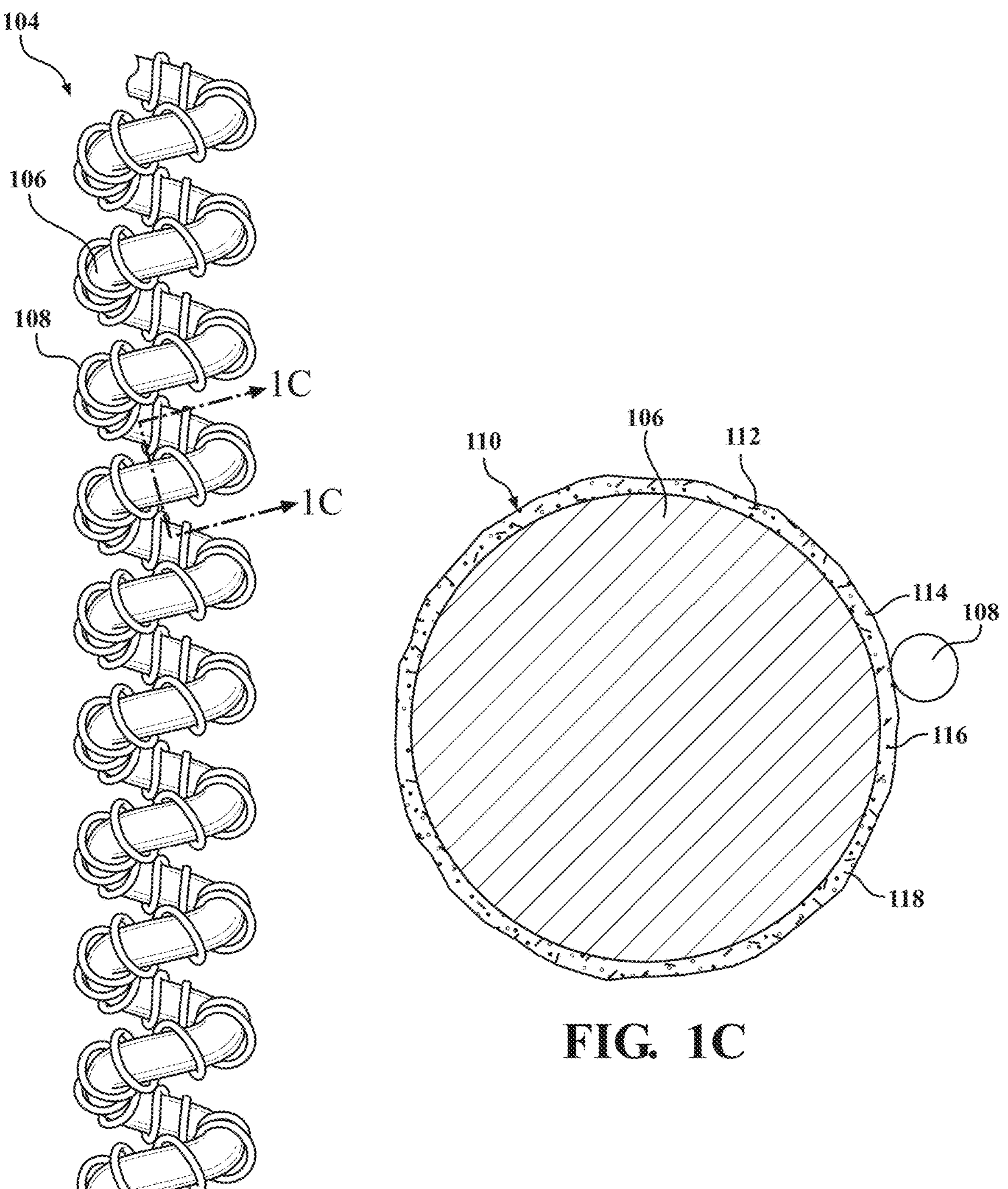

FIGS. 1A-1C illustrate an elastomer skin 100 with embedded unequally pre-loaded and coated $TCP_{FL}^{RHW}$ actuators 104-1, 104-2, and 104-3. Specifically, FIG. 1A depicts an isometric view of the elastomer skin 100 with embedded unequally pre-loaded and coated $TCP_{FL}^{RHW}$ actuators 104-1, 104-2, and 104-3, FIG. 1B illustrates a $TCP_{FL}^{RHW}$ actuator 104 with a carbon nanotube-metal nanoparticle-mesoporous carbon-polyvinyl alcohol (CNT-M-C-PVA) coating 110 and FIG. 1C illustrates a longitudinal view of a $TCP_{FL}^{RHW}$ actuator 104 with a CNT-M-C-PVA coating 110. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figures 4A, 4B, 4C:
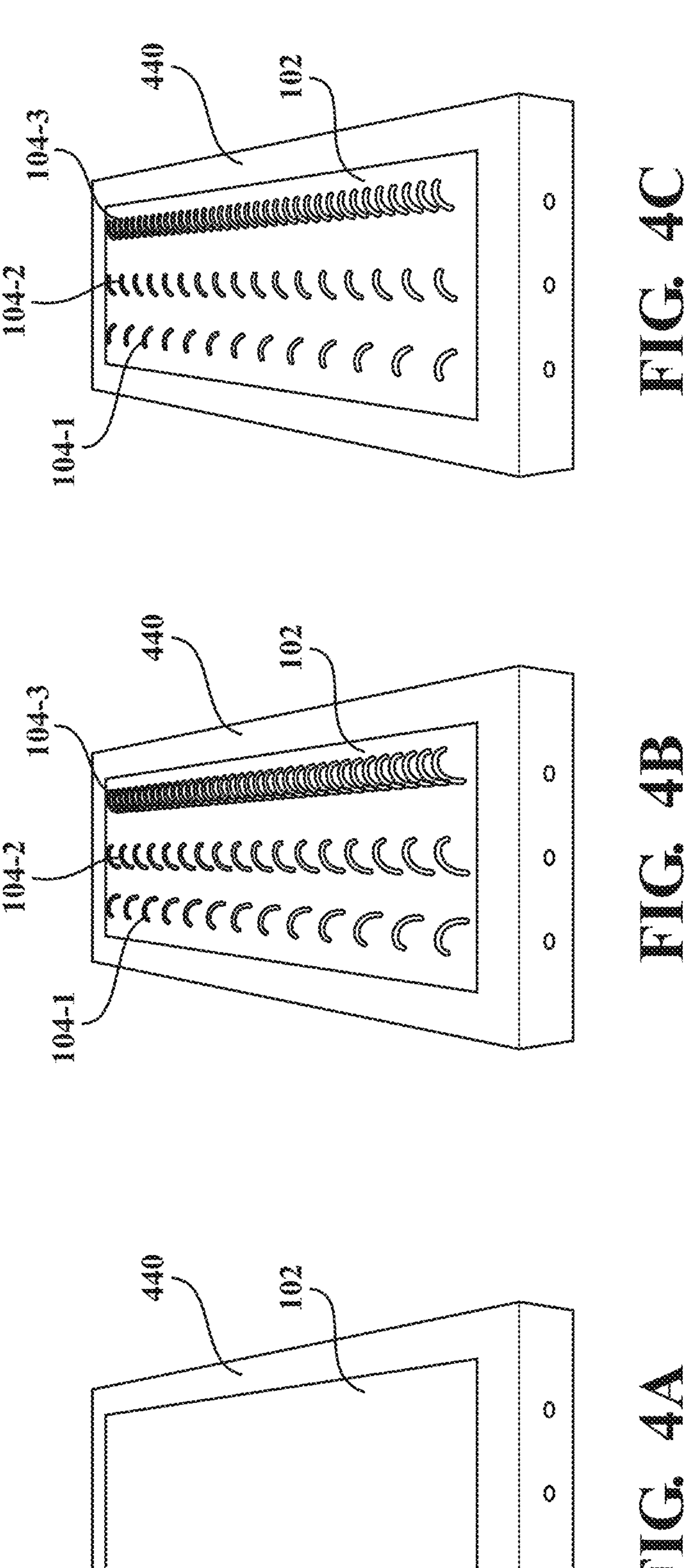
FIGS. 4A-4C depict the manufacturing operations for the elastomer skin with embedded unequally pre-loaded and coated $TCP_{FL}^{RHW}$ actuators.

As described above, the elastomer skin 100 includes an elastomer substrate 102. The elastomer substrate 102 may be a flexible material that can bend and twist as the embedded coated $TCP_{FL}^{RHW}$ actuators 104 bend responsive to an applied activation energy. The elastomer substrate 102 may have a high coefficient of friction to facilitate gripping, squeezing, carrying, or otherwise manipulating a gripped object. In an example, the elastomer substrate 102 may be a silicone material. FIG. 4A, depicted below, describes the fabrication of the elastomer substrate 102.

The elastomer skin 100 further includes a set of unequally pre-loaded coated $TCP_{FL}^{RHW}$ actuators 104-1, 104-2, and 104-3 (referred to collectively as 104) embedded in the elastomer substrate 102. In the example depicted in FIG. 1A, the coated $TCP_{FL}^{RHW}$ actuators 104 are raised above the surface of the elastomer substrate 102. However, in some examples, the coated $TCP_{FL}^{RHW}$ actuators 104 may be entirely within the body of the elastomer substrate 102. As described above, the coated $TCP_{FL}^{RHW}$ actuators 104 bend when subject to an activation energy. For example, during use or operation, electrical current flows through a resistance heating wire 108 that is coiled around a twisted and coiled polymer monofilament fishing line ($TCP_{FL}$) 106. The resistance heating wire 108 is heated via joule heating. Heat transfers from the resistance heating wire 108 to the $TCP_{FL}$ 106, and the $TCP_{FL}$ 106 increases in temperature and decreases in length due to the negative coefficient of thermal expansion of the polymer fishing line. Stated differently, the coated $TCP_{FL}^{RHW}$ actuators 104 decrease in length when heated. Then, the electrical current flowing through the resistance heating wire 108 is terminated, the resistance heating wire 108 and the $TCP_{FL}$ 106 cool (decrease in temperature), and the $TCP_{FL}$ 106 increases in length. Stated differently, the $TCP_{FL}^{RHW}$ actuators 104 increase in length during cooling. Accordingly, the coated $TCP_{FL}^{RHW}$ actuators 104 contract like a muscle when actuated (heated) and relax like a muscle when cooled.

As the elastomer substrate 102 is flexible and morphable, the elastomer substrate 102 bends responsive to the activation of the actuators 104. In an example, the elastomer substrate 102 is a flexible silicone material.

Figures 2A, 2B:
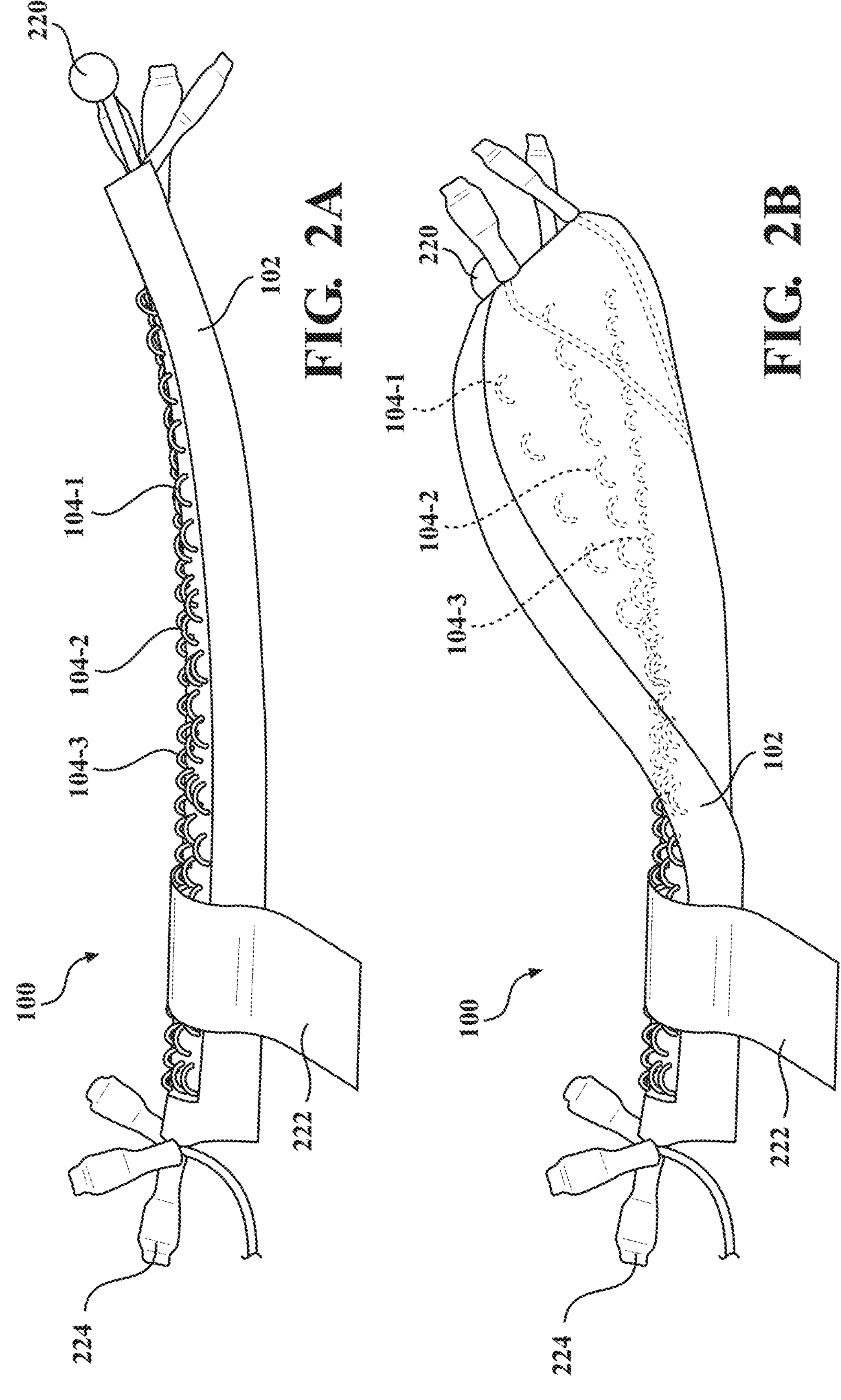
FIGS. 2A and 2B depict the twisting motion of an elastomer skin with embedded unequally pre-loaded and coated $TCP_{FL}^{RHW}$ actuators.

As described above, each coated $TCP_{FL}^{RHW}$ actuator 104-1, 104-2, and 104-3 may have different pre-loads, which different pre-loading causes the different coated $TCP_{FL}^{RHW}$ actuators 104-1, 104-2, and 104-3 to increase/decrease in length differently for a given activation energy and/or current. FIGS. 2A and 2B depict how the elastomer skin 100 morphs based on the unequal pre-loading of the associated $TCP_{FL}^{RHW}$ actuators 104.

This different pre-loading may be effectuated in various ways. In one example, the longitudinal strain of a coated $TCP_{FL}^{RHW}$ actuator 104 may affect its extension/contraction. For example, a coated $TCP_{FL}^{RHW}$ actuator 104 with a greater amount of longitudinal strain may contract more than a coated $TCP_{FL}^{RHW}$ actuator 104 with a lesser amount of longitudinal strain. Accordingly, in one example, a first coated $TCP_{FL}^{RHW}$ actuator 104-1 within the elastomer substrate 102 has a first longitudinal strain, while a second coated $TCP_{FL}^{RHW}$ actuator 104-2 within the elastomer substrate 102 has a second longitudinal strain that is different than the first longitudinal strain. In an example, the longitudinal strain of a particular coated $TCP_{FL}^{RHW}$ actuator 104 may be based on an unstretched length of the coated $TCP_{FL}^{RHW}$ actuator 104. That is, during manufacturing, the elastomer substrate 102 has a given length 111. Each coated $TCP_{FL}^{RHW}$ actuator 104 also has a given length, which is shorter than the length 111 of the elastomer substrate 102. Accordingly, during formation, each coated $TCP_{FL}^{RHW}$ actuator 104 is stretched and placed within the elastomer substrate 102, with shorter coated $TCP_{FL}^{RHW}$ actuators 104 stretched to a more significant degree. The greater the stretch of the coated $TCP_{FL}^{RHW}$ actuator 104 when placed in the elastomer substrate 102, the greater the longitudinal strain. For example, given an elastomer substrate 102 length 111 of 100 millimeters (mm), a coated $TCP_{FL}^{RHW}$ actuator 104 with an unstretched length of 55 mm may have more longitudinal strain when stretched to span the elastomer substrate length 111 compared to a coated $TCP_{FL}^{RHW}$ actuator 104 with an unstretched length of 59 mm. Accordingly, in an example, a first coated $TCP_{FL}^{RHW}$ actuator 104-1 has a first unstretched length while a second coated $TCP_{FL}^{RHW}$ actuator 104-2 has a second unstretched length that is different than the first unstretched length.

While FIG. 1A depicts unequal longitudinal strain as the variable which defines the unequal pre-load of the $TCP_{FL}^{RHW}$ actuators 104, the unequal pre-load may be based on a different modality. For example, the diameter of the $TCP_{FL}$ 106 affects the pre-loading. For example, a $TCP_{FL}$ 106 with a smaller diameter may be heated more rapidly and actuate quicker and faster than a $TCP_{FL}$ 106 with a larger diameter, for a given input power. As such, in one example, a twisted and coiled polymer fishing line 106 of a first coated $TCP_{FL}^{RHW}$ actuator 104-1 has a first diameter while a twisted and coiled polymer fishing line of a second coated $TCP_{FL}^{RHW}$ actuator 104-2 has a second diameter that is different than the first diameter. As such, the first coated $TCP_{FL}^{RHW}$ actuator 104-1 has a different radius of curvature following activation than the second coated $TCP_{FL}^{RHW}$ actuator 104-2 such that the elastomer substrate 102 twists as depicted in FIGS. 2A and 2B. Note that reducing the diameter of the $TCP_{FL}$ 106 may enhance the response speed and require reduced power for actuation, thus allowing for faster actuation frequencies. On the other hand, increasing the $TCP_{FL}$ 106 diameter may result in a larger pull force for applications requiring heavier loads.

In an example, the set of unequally pre-loaded coated $TCP_{FL}^{RHW}$ actuators 104 are sequentially arranged across a width of the elastomer substrate 102 based on their associated pre-load. For example, when unstretched coated $TCP_{FL}^{RHW}$ actuator 104 length is the variable that is altered to achieve unequal pre-loading, a shortest coated $TCP_{FL}^{RHW}$ actuator 104 may be placed at one side of the elastomer substrate 102 while the longest coated $TCP_{FL}^{RHW}$ actuator 104 is placed at the other side. For example, a first coated $TCP_{FL}^{RHW}$ actuator 104-1 may have an unstretched length of 55 mm, a second coated $TCP_{FL}^{RHW}$ actuator 104-2 may have an unstretched length of 57 mm, and a third coated $TCP_{FL}^{RHW}$ actuator 104-3 may have an unstretched length of 59 mm. In this example, the portion of the elastomer substrate 102 adjacent to the first coated $TCP_{FL}^{RHW}$ actuator 104-1 may bend more (i.e., have a smaller radius of curvature), while the portion of the elastomer substrate 102 adjacent to the third coated $TCP_{FL}^{RHW}$ actuator 104-3 may bend less (i.e., have a larger radius of curvature). In this example, the body of the elastomer skin 100 may twist, as depicted in FIG. 2B.

In an example where $TCP_{FL}$ 106 diameter is the variable that is altered, the monofilament $TCP_{FL}$ 106 of a first coated $TCP_{FL}^{RHW}$ actuator 104-1 may have a diameter of 0.5 mm, a monofilament $TCP_{FL}$ 106 of a second coated $TCP_{FL}^{RHW}$ actuator 104-2 may have a diameter of 0.65 mm, and a monofilament $TCP_{FL}$ 106 of a third coated $TCP_{FL}^{RHW}$ actuator 104-3 may have a diameter of 0.8 mm. While reference is made to particular varied characteristics of the coated TCP RHW actuators 104 to generate a determined pre-load of a coated $TCP_{FL}^{RHW}$ actuator 104, different characteristics may be varied to generate the pre-load, which pre-load may be different per coated $TCP_{FL}^{RHW}$ actuator 104. Moreover, it should be noted that the difference in pre-load of the different coated $TCP_{FL}^{RHW}$ actuators 104 defines how the elastomer skin 100 bends and/or twists (e.g., the degree of twist and the overall amount of bending).

As described above, each coated $TCP_{FL}^{RHW}$ actuator 104 includes a twisted and coiled polymer fishing line, $TCP_{FL}$ 106 surrounded by a resistance heating wire 108. In an example, the diameter of the $TCP_{FL}$ 106 may be between 0.5 mm and 1.0 mm. For example, the diameter of the $TCP_{FL}$ 106 may be 0.8 mm. When coiled, the outside diameter of the coated $TCP_{FL}^{RHW}$ actuator 104 may be between 3.00 mm and 4.00 mm. For example, the outside diameter of the coated $TCP_{FL}^{RHW}$ actuator 104 may be 3.4 mm. While particular dimensions are referenced, the coated $TCP_{FL}^{RHW}$ actuator 104 and $TCP_{FL}$ 106 may have other dimensions. In an example, the $TCP_{FL}$ 106 may be a nylon monofilament.

As described above, the coated $TCP_{FL}^{RHW}$ actuators 104 exhibit negative thermal expansion through joule heating via a resistance heating wire 108 that is coiled around the $TCP_{FL}$ 106. In an example, the resistance heating wire 108 may be a nichrome resistance heating wire having a diameter of between 140 and 180 micrometers (μm). For example, the nichrome resistance heating wire 108 may have a diameter of 160 μm. As used herein, "nichrome resistance wire" refers to resistance heating wire 108 containing nickel and chromium, for example, about 80 wt. % nickel and about 20 wt. % chromium with incidental impurities. Note that while particular reference is made to particular materials and dimensions for the resistance heating wire 108, the resistance heating wire 108 may have other dimensions and be formed of different materials.

The coated $TCP_{FL}^{RHW}$ actuators 104 may be formed in a variety of ways. For example, in some variations, the coated $TCP_{FL}^{RHW}$ actuators 104 may be manufactured by first inserting "twist" into a polymer fishing line, wrapping resistance heating wire 108 onto the twisted polymer fishing line, mandrel coiling the twisted polymer fishing line with the wrapped resistance heating wire 108 about a mandrel, and thermal annealing the $TCP_{FL}$ 106 with the wrapped resistance heating wire 108 to form a $TCP_{FL}^{RHW}$ actuator.

Regarding inserting twist into the polymer fishing line, in some variations, a first or upper end of a polymer fishing line with a predefined length is attached to a first motor shaft and the second or bottom end of the polymer fishing line is attached to a predefined weight such that the polymer fishing line hangs or extends vertically from the motor shaft. Then, the motor is rotated at a predefined speed in a given direction (e.g., a counterclockwise direction) such that the polymer fishing line is twisted, i.e., a twist is inserted in the polymer fishing line. As the polymer fishing line is twisted, it shrinks in length, and when coiling in the polymer fishing line is observed, rotation of the first motor is stopped, and the "twist insertion" of the polymer fishing line is concluded.

Regarding incorporating or wrapping the resistance heating wire 108 with the twisted polymer fishing line, in some variations, an untwisted polymer fishing line with the predefined weight is attached to the bottom end of the twist-inserted polymer fishing line and a resistance heating wire 108 with a predefined length is attached to the first motor shaft. Then, both the twisted polymer fishing line and the resistance heating wire are placed within a guide carriage with a guide rod and the first motor is rotated at a predefined speed as the guide carriage and guide rod move down along the twisted polymer fishing line such that the resistance heating wire 108 is wrapped around the twisted polymer fishing line with a predefined pitch.

Regarding mandrel coiling of the twisted polymer fishing line with the wrapped resistance heating wire 108, a mandrel with a predefined diameter is coupled to a second motor, the upper end of the twisted polymer fishing line with the wrapped resistance heating wire 108 is attached to the mandrel, and the mandrel is rotated in a predefined direction such that the twisted polymer fishing line with the wrapped resistance heating wire 108 coils about or around the mandrel. In some variations, the mandrel is rotated in a predefined direction (e.g., counterclockwise) such that the resulting $TCP_{FL}^{RHW}$ actuator functions as a homochiral muscle, while in other variations the mandrel is rotated in a predefined direction (e.g., clockwise) such that the resulting $TCP_{FL}^{RHW}$ actuator functions as a heterochiral muscle.

Regarding thermal annealing, the $TCP_{FL}$ 106 with the wrapped resistance heating wire 108, in some variations, the mandrel with the $TCP_{FL}$ 106 and the wrapped resistance heating wire 108 coiled thereabout is placed in a furnace at a predefined temperature for a predefined period of time. After annealing, a $TCP_{FL}^{RHW}$ actuator is provided. Details regarding the coating of the $TCP_{FL}^{RHW}$ are provided below.

FIG. 1C is a cross-sectional diagram of the coated $TCP_{FL}^{RHW}$ actuator 104 taken along the line 1C-1C in FIG. 1B. As depicted and described, the coated $TCP_{FL}^{RHW}$ actuator 104 has a $TCP_{FL}$ 106 and a resistance heating wire 108.

As described above, the coated $TCP_{FL}^{RHW}$ actuator 104 is coated to enhance dynamic actuation. That is, the coating 110 has a heat transfer coefficient that is greater than the heat transfer coefficient for the $TCP_{FL}$ 106. Due to this improved thermal conductivity, the dynamic actuation of these coated $TCP_{FL}^{RHW}$ actuators 104 may be better than non-coated coated $TCP_{FL}^{RHW}$ actuation characteristics. That is, heating and cooling the coated $TCP_{FL}^{RHW}$ actuator 104 to actuate movement requires less energy (power) than actuating similar movement of an uncoated $TCP_{FL}^{RHW}$ actuator.

In an example, the coating 110 is a mixture of carbon nanotubes 112, metal nanoparticles 114, and mesoporous carbon nanoparticles 116. In one specific example, the metal nanoparticles 114 are nickel nanoparticles. However, in other variations, the metal nanoparticles 114 can be any material having desired/good electrical and/or heat conductivity, such as silver nanoparticles, gold nanoparticles, and platinum nanoparticles, among others. The metal nanoparticles 114 actively coalesce onto the pores of mesoporous carbon, thus providing better thermal contacts when applied to the $TCP_{FL}$ 106.

In a further example, the coating 110 includes a polymer matrix 118, and the carbon nanotubes 112, metal nanoparticles 114, and mesoporous carbon nanoparticles 116 are dispersed in the polymer matrix 118. The polymer matrix 118 is a binding agent for the carbon nanotubes 112, the metal nanoparticles 114, and the mesoporous carbon nanoparticles 116 on the surface of the $TCP_{FL}$ 106. In at least one variation, the polymer matrix 118 is a water-soluble polymer such as polyvinyl alcohol (PVA), polyethylene glycol, a polyacrylamide, a polyacrylic acid copolymer, an epoxy, a gelatin, and a glycerin glue, among others.

In some variations, the coating 110 has a composition of between 2.0 weight percent (wt. %) and 20.0 wt. % carbon nanotubes 112, between 2.0 wt. % and 20.0 wt. % metal nanoparticles 114, and between 20.0 and 60.0 wt. % mesoporous carbon nanoparticles 116. In at least one variation, the coating 110 has a composition of between 5.0 wt. % and 15.0 wt. % carbon nanotubes 112, between 5.0 wt. % and 15.0 wt. % metal nanoparticles 114, and between 30.0 wt. % and 50.0 wt. % mesoporous carbon nanoparticles 116. For example, in some variations the coating 110 has an overall composition of between 2.0 wt. % and 20.0 wt. % carbon nanotubes 112, between 2.0 wt. % and 20.0 wt. % metal nanoparticles 114, between 20.0 wt. % and 60.0 wt. % mesoporous carbon nanoparticles 116, and between 20.0 wt. % and 60.0 wt. % polymer matrix 118. In at least one variation, the coating 110 has an overall composition of between 5.0 wt. % and 15.0 wt. % carbon nanotubes 112, between 5.0 wt. % and 15 wt. % metal nanoparticles 114, between 30.0 wt. % and 50.0 wt. % mesoporous carbon nanoparticles 116, and between 30.0 wt. % and 50.0 wt. % polymer matrix 118. In some variations, the coating 110 has an overall composition of between 7.5 wt. % and 12.5 wt. % carbon nanotubes 112, between 7.5 wt. % and 12.5 wt. % metal nanoparticles 114, between 35.0 wt. % and 45.0 wt. % mesoporous carbon nanoparticles 116, and between 35.0 wt. % and 45.0 wt. % polymer matrix 118.

Not being bound by theory, the coating 110 enhances the joule heating of the $TCP_{FL}$ 106. For example, the heat transfer coefficients of the carbon nanotubes 112 and metal nanoparticles 114 are greater than the heat transfer of the $TCP_{FL}$ 106 such that heat from joule heating of the resistance heating wire 108 is distributed or transferred faster and/or more efficiently to the $TCP_{FL}$ 106 when the coating 110 is on the $TCP_{FL}$ 106 compared to when the coating 110 is not on the $TCP_{FL}$ 106. In addition, the mesoporous carbon nanoparticles 116 are hydrophobic and provide a porous structure that aids or enhances bonding between the carbon nanotubes 112, the metal nanoparticles 114, and/or the polymer matrix 118.

Regarding the coating of the coated $TCP_{FL}^{RHW}$ actuators 104. As described above, the coating 110 is formed from a mixture of polyvinyl alcohol (PVA), metal (e.g., nickel) nanoparticles 114, carbon nanotubes 112, and mesoporous carbon dust. For example, in at least one variation, 1 gram of PVA is mixed and stirred with 100 milliliters of distilled water at 75-80° C. for 15-20 minutes until a clear solution is observed. Then, 1 gram of mesoporous carbon dust with an average particle diameter of less than 500 nanometers (nm), 0.25 grams of carbon nanotubes 112 with an average diameter 8.7-10.0 nm, and 0.25 grams of nickel nanoparticles with an average diameter less than 100 nm are added to the PVA+water solution at 65° C. and stirred for 1-2 hours, followed by continued stirring while the CNT-Ni—C-PVA-water solution cools to room temperature. Then, the CNT-Ni—C-PVA-water solution is centrifuged for 20 minutes at room temperature and the supernatant is separated or removed such that a pellet of the CNT-Ni—C-PVA is provided. In some variations, some of the supernatant is used to re-dissolve the CNT-Ni—C-PVA pellet to form a CNT-Ni—C-PVA coating solution, and a $TCP_{FL}^{RHW}$ actuator is immersed in the CNT-Ni—C-PVA coating solution, shaken vigorously for 4-5 minutes, and then annealed at 80° C. for 1 hour such that a CNT-M-C coated $TCP_{FL}^{RHW}$ actuator 104 as shown in FIG. 1B is provided.

As depicted in FIG. 1C, it may be that the coating 110 does not adhere to the resistance heating wire 108, and just coats the $TCP_{FL}$ 106.

In order to better understand the properties of coated $TCP_{FL}^{RHW}$ actuators 104, testing of uncoated $TCP_{FL}^{RHW}$ actuators and coated $TCP_{FL}^{RHW}$ actuators 104 was performed using a test apparatus that included a hook, a weight, and a power supply such that testing of tensile actuation, dynamical performance in air and water, thermal hysteresis, and actuator efficiency of coated $TCP_{FL}^{RHW}$ actuators 104 (coated pre the example discussed above) was performed and compared to uncoated $TCP_{FL}^{RHW}$ actuators. These tests indicate that the coated $TCP_{FL}^{RHW}$ actuators 104 can contract by about 60% at 1.99 megapascals (MPa) with a 0.27 Amp (A) input current. These coated $TCP_{FL}$ RHW actuators 104 produce 7.5 kilowatts (KW) of specific power per kilogram of muscle weight and lift over 200 times their weight. Compared to non-coated $TCP_{FL}^{RHW}$ actuators, CNT-Ni—C-PVA coated $TCP_{FL}^{RHW}$ actuators 104 consume about 31% less power for similar actuation strain, are 33% to 50% faster in terms of dynamic actuation, and can continuously work for 210,000 lifecycles at 0.1 Hz in air at 8% to 10% actuation strain. Other results indicate that the coated $TCP_{FL}^{RHW}$ actuators 104 exhibit at least a 50% energy conversion efficiency improvement compared to the $TCP_{FL}^{RHW}$ actuator without the coating, at least a 60% energy conversion efficiency improvement compared to the $TCP_{FL}^{RHW}$ actuator without the coating, and at least 25% faster dynamic response than the $TCP_{FL}^{RHW}$ actuator without the coating. That is, the CNT-Ni—C-PVA coated $TCP_{FL}^{RHW}$ actuators 104 exhibit enhanced performance in regard to actuator efficiency, hydrophobicity, power consumption, actuation frequency, dynamic actuation, and cooling rate as compared to non-coated $TCP_{FL}^{RHW}$ actuators.

FIGS. 2A and 2B depict the twisting motion of an elastomer skin 100 with embedded unequally pre-loaded and coated $TCP_{FL}^{RHW}$ actuators 104. Specifically, FIG. 2A depicts the elastomer skin 100 before an activation energy is applied and FIG. 2B depicts the elastomer skin 100 after an activation energy (i.e., a current) is provided to the coated $TCP_{FL}^{RHW}$ actuators 104. The activation energy heats the resistance heating wires 108 and causes the coated $TCP_{FL}^{RHW}$ actuators 104 to shorten in length. Given the coiling of the coated $TCP_{FL}^{RHW}$ actuators 104, the contraction manifests as a bending of the coated $TCP_{FL}^{RHW}$ actuator 104.

As described above, by virtue of different pre-loadings, the different coated $TCP_{FL}^{RHW}$ actuators 104 respond differently to a given activation energy. For example, a first coated $TCP_{FL}^{RHW}$ actuator 104-1 may contract in length more, which may manifest as a bend with a tighter radius of curvature as compared to second and third coated $TCP_{FL}^{RHW}$ actuators 104-2 and 104-3, which may have different pre-loads (e.g., different unstretched length, different longitudinal strains, and/or different diameters). As the different coated $TCP_{FL}^{RHW}$ actuators 104 respond differently to the activation energy and are positioned within the elastomer substrate 102 based on their pre-loading when the activation energy is applied, the elastomer substrate 102 bends and twists as depicted in FIG. 2B. Were each coated $TCP_{FL}^{RHW}$ actuator 104 equally pre-loaded, the elastomer skin 100 would bend uniformly without the twisting depicted in FIG. 2B.

Such an elastomer skin 100 may be used in various gripping and twisting actions. For example, the bending and twisting movement of the elastomer skin 100, as depicted in FIG. 2B may be used to grip and squeeze a fluid, soft solid, highly viscous liquid, and/or a non-Newtonian fluid from a tube.

In this example, the elastomer skin 100 further includes electrical contacts 224 at the ends of the coated $TCP_{FL}^{RHW}$ actuators 104. The activation energy is applied through these electrical contacts 224. For simplicity in FIGS. 2A and 2B, a single electrical contact 224 is indicated with a reference number. However, in use, similar electrical contacts 224 may be placed at either end of each coated $TCP_{FL}^{RHW}$ actuator 104. In an example, the activation energy may be a current delivered at a particular frequency. Example activation energies are described below in connection with FIGS. 5A-5C. In an example, the activation energy applied to each coated $TCP_{FL}^{RHW}$ actuator 104 is the same. However, given the different pre-loading, different coated $TCP_{FL}^{RHW}$ actuators 104 may respond differently to this similar activation energy. That is, the elastomer substrate 102 twists as depicted in FIG. 2B due to differently pre-loaded coated $TCP_{FL}^{RHW}$ actuators 104 responding differently to the activation energy.

In an example, different coated $TCP_{FL}^{RHW}$ actuators 104 may receive different activation energies. For example, electrical contacts 224 of a first coated $TCP_{FL}^{RHW}$ actuator 104-1 may receive a first activation energy, while electrical contacts 224 of a second coated $TCP_{FL}^{RHW}$ actuator 104-2 receive a second activation energy that is different than the first activation energy. Doing so may further alter the response/movement of the associated coated $TCP_{FL}^{RHW}$ actuators 104. For example, a lower activation energy (i.e., a lower current) may trigger a smaller length contraction/bending movement, while a higher activation energy (i.e., a higher current) may trigger a more significant length contraction/bending movement. Thus, in addition to including differently pre-loaded coated $TCP_{FL}^{RHW}$ actuators 104, applying different activation energies to different coated $TCP_{FL}^{RHW}$ actuators 104 may further alter the bending/twisting movement. As such, the elastomer skin 100 of the present specification has a widely customizable bending/twisting movement by varying coated $TCP_{FL}^{RHW}$ actuator 104 pre-load and/or varying activation energy characteristics.

To test the effect of the unequally pre-loaded and coated $TCP_{FL}^{RHW}$ actuators 104 on elastomer skin 100 twisting, a reference pin 220 was attached to an end of the elastomer skin 100 which is held in place by a mount 222 (e.g., adhesive tape). The results of the test are described below in connection with FIGS. 5A-5C.

Figure 3:
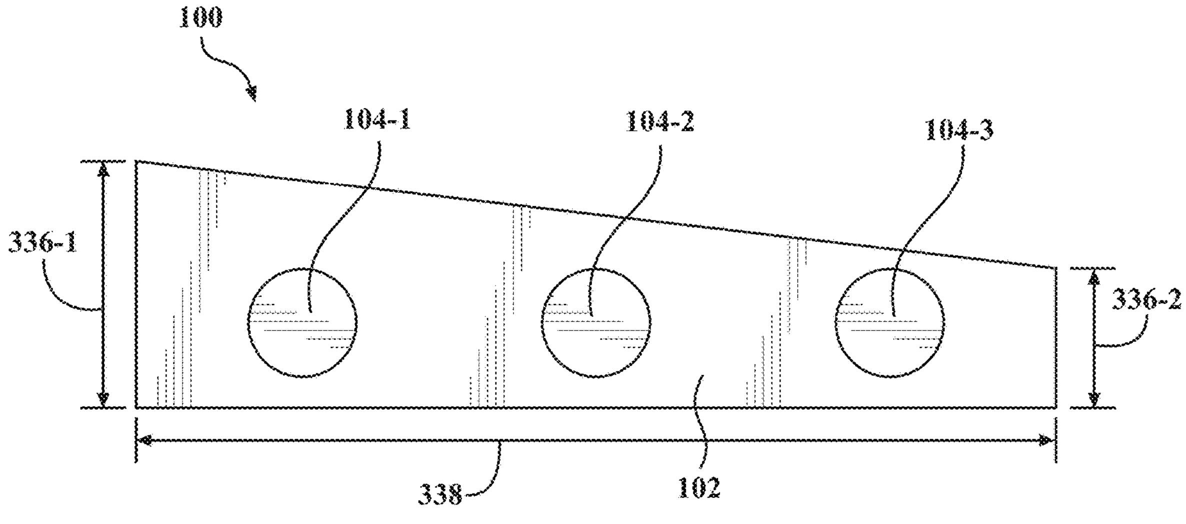
FIG. 3 depicts a cross-sectional view of an example elastomer skin with embedded unequally pre-loaded and coated $TCP_{FL}^{RHW}$ actuators.

FIG. 3 depicts a cross-sectional view of an example elastomer skin 100 with embedded unequally pre-loaded and coated $TCP_{FL}^{RHW}$ actuators 104. In addition to including differently pre-loaded coated $TCP_{FL}^{RHW}$ actuators 104, the elastomer skin 100 bending motion may be customized based on the physical properties of the elastomer substrate 102. For example, the elastomer substrate 102 has a movement inertia property, with the inertia greater where there is more material. Accordingly, the height 336 of the elastomer substrate 102 may vary across a width 338 of the elastomer substrate 102, which may change the bending and twisting characteristics of the elastomer skin 100. For example, a first side of the elastomer substrate 102 may have a first height 336-1 while a second side of the elastomer substrate 102 has a second height 336-2. The portion of the elastomer substrate 102 surrounding the third coated $TCP_{FL}^{RHW}$ actuator 104-3 may have less bending inertia based on the smaller cross-sectional first height 336-1 and may thus bend more as compared to the portion of the elastomer substrate 102 surrounding the first coated $TCP_{FL}^{RHW}$ actuators 104-1, which has the greater second height 336-2 and more material.

FIGS. 4A-4C depict the manufacturing operations for the elastomer skin 100 with embedded unequally pre-loaded and coated $TCP_{FL}^{RHW}$ actuators 104. First, as depicted in FIG. 4A, a mold 440 is fabricated into which a liquid elastomer material is poured to a desired height, which desired height may be between 0.75 mm and 1.25 mm, for example, 1 mm. In an example, the mold 440 is 3D printed from a polylactic acid (PLA) material. The elastomer substrate 102 is then allowed to cure. Following curing, the coated $TCP_{FL}^{RHW}$ actuators 104-1, 104-2, and 104-3 are placed on top of, or slightly embedded into, the elastomer substrate 102, as depicted in FIG. 4B.

As described above, the coated $TCP_{FL}^{RHW}$ actuators 104 have different pre-loads. In one particular example, the pre-load results from coated $TCP_{FL}^{RHW}$ actuators 104 with different unstretched lengths being stretched when placed into the elastomer substrate 102. Due to the different unstretched lengths, upon stretching, the different coated $TCP_{FL}^{RHW}$ actuators 104 may have a different longitudinal strain when embedded in the elastomer substrate 102. Accordingly, the ends of the coated $TCP_{FL}^{RHW}$ actuators 104 may be fixed in place at the ends of the mold 440, for example via weights.

Following placement of the coated $TCP_{FL}^{RHW}$ actuators 104, additional liquid silicone is poured into the mold 440 and allowed to cure as depicted in FIG. 4C. In some examples, the additional liquid silicone completely envelopes the coated $TCP_{FL}^{RHW}$ actuators 104, in other examples, a portion of the coated $TCP_{FL}^{RHW}$ actuators 104 may be exposed above the surface of the elastomer substrate 102. The entire soft elastomer skin 100 is removed from the mold 440. Electrical contacts 224 are then coupled to an end of the coated $TCP_{FL}^{RHW}$ actuators 104 and used to provide the coated $TCP_{FL}$ RHW actuators 104 with a current. The applied current to the unequally pre-loaded coated $TCP_{FL}$ RHW actuators 104 causes the elastomer skin 100 to twist, as depicted in FIG. 2B.

Figure 5A:
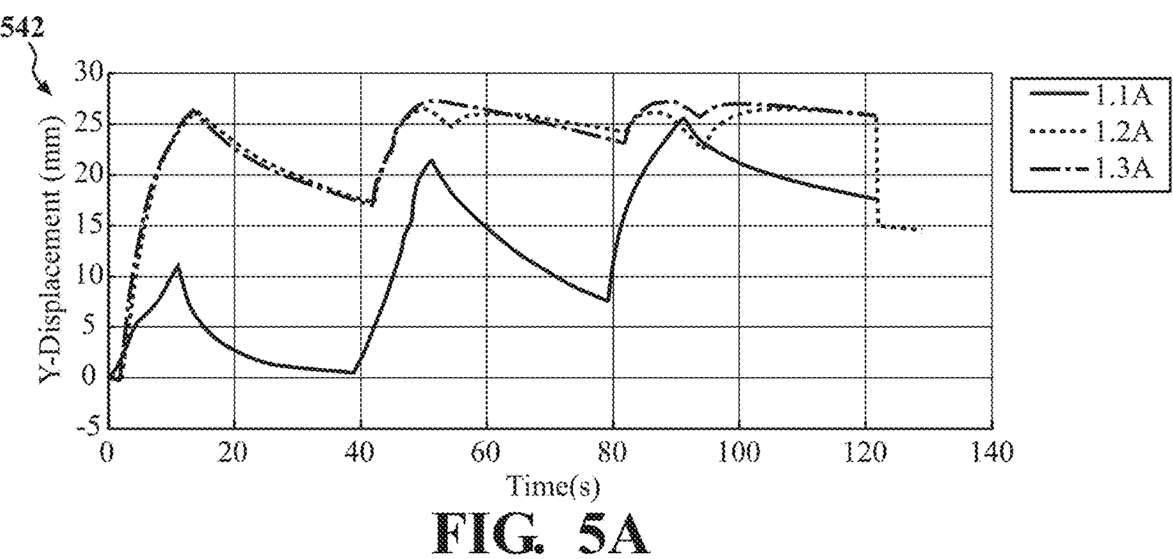
FIGS. 5A-5C depict the y-displacement of different-width elastomer skins with embedded unequally pre-loaded and coated $TCP_{FL}^{RHW}$ actuators under different activation energies.
Figure 5B:
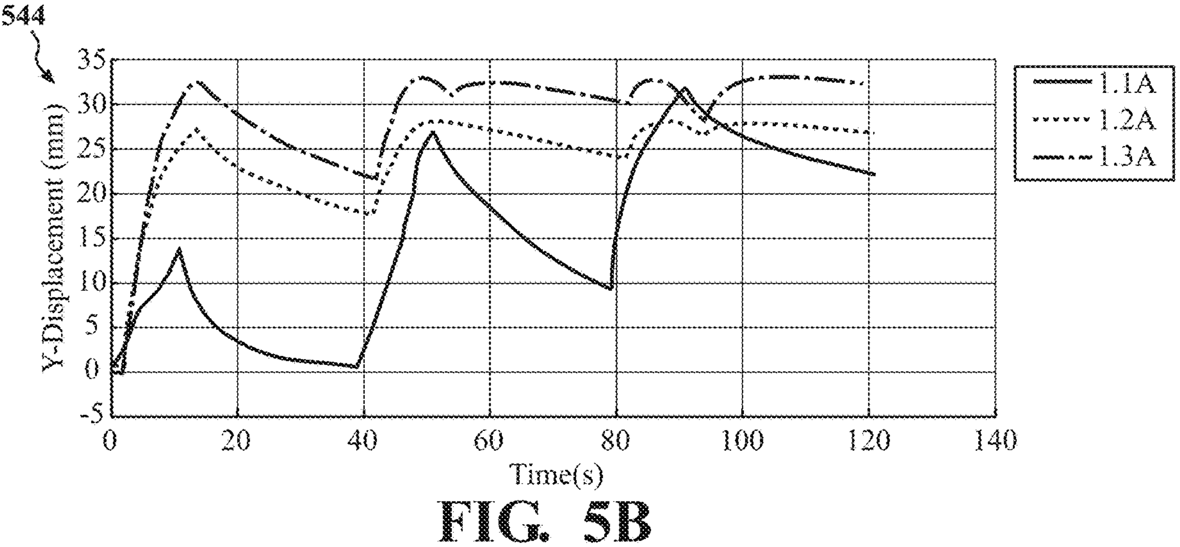
Figure 5C:
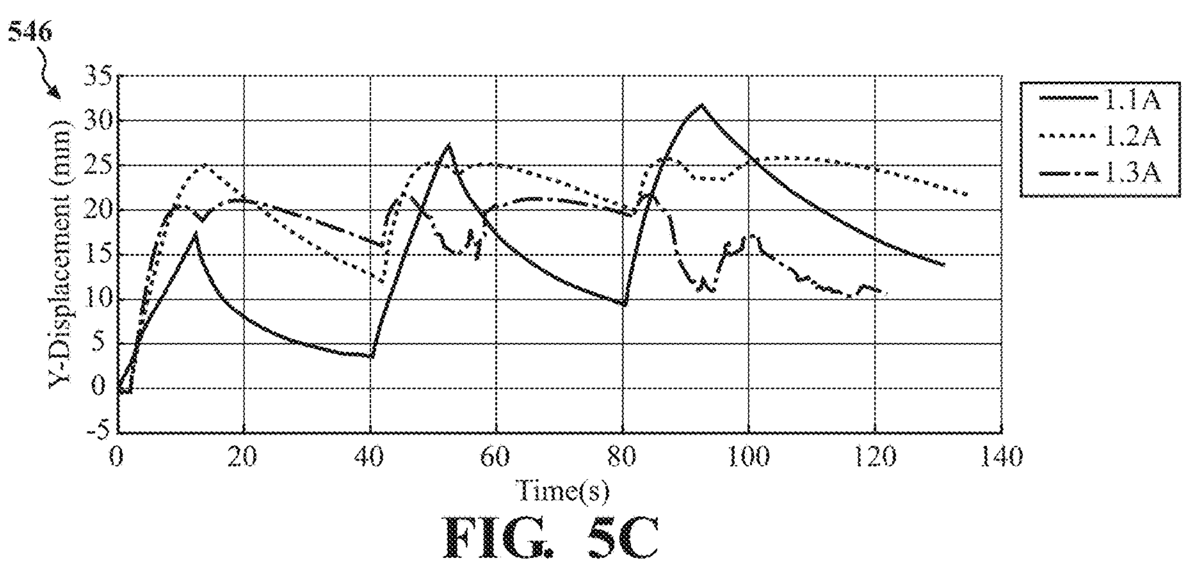

FIGS. 5A-5C are graphical plots 542, 544, and 546 that depict the y-displacement of different width elastomer skins 100 with embedded unequally pre-loaded and coated $TCP_{FL}^{RHW}$ actuators 104 under different activation energies. Specifically, FIG. 5A is a graphical plot 542 that depicts the y-displacement of a reference pin 220 over time for an elastomer skin 100 having a width 338 of 20 mm, FIG. 5B is a graphical plot 544 that depicts the y-displacement of a reference pin 220 over time for an elastomer skin 100 having a width 338 of 25 mm, and FIG. 5C is a graphical plot 546 that depicts the y-displacement of a reference pin 220 over time for an elastomer skin 100 having a width 338 of 30 mm. In each case, the elastomer skin 100 had a length of 100 mm and a height of 4 mm. Moreover, in each case, the activation energies were currents of 1.1 A, 1.2 A, and 1.3 A at a frequency of 0.025 Hz. The resulting voltages and powers associated with the different activation currents were 26 V, 27 V, and 28 V, and 28.6 Watts (W), 32.4 W, and 36.4 W, respectively. The activation energy was applied for approximately 8-10 seconds for each case. It is noted that increasing the heating cycle (i.e., the application of the activation energy) may result in a greater twisting motion.

As depicted in each of FIGS. 5A and 5B, for a 20 mm elastomer skin 100 and a 25 mm elastomer skin 100, a lower input current results in a reduced y-displacement per cycle compared to higher input currents. That is, the reference pin 220 has a reduced y-displacement when a lower input current is applied to the coated $TCP_{FL}^{RHW}$ actuator 104 as compared to when a larger input current is applied.

It was also observed that a greater angular displacement (i.e., more twisting) was exhibited when higher input currents were applied. It is also noted that in each case, as depicted in FIGS. 5A-5C, the elastomer skin 100 returned more closely to a pre-activated shape and position when a lower current was applied. This may be due to the elastomer skin 100 being more greatly heated and requiring more time to cool down when a higher input current is provided. Accordingly, a lower input current may be used when it is desirable for the elastomer skin 100 to more fully expand and/or where there is less time to allow the elastomer skin 100 to cool between heating cycles. A higher input current may be provided when the elastomer skin 100 has more time between heating cycles to flatten/cool fully. Moreover, the time to cool/flatten following heating and the angular twist may vary based on the thickness of the material, with a thicker elastomer skin 100 twisting less and flattening more quickly.

As such, the elastomer skin 100 not only provides a unique angular twisting movement for soft robotics devices but can be tailored to a particular use case by varying properties of coated $TCP_{FL}^{RHW}$ actuators 104, the elastomer substrate 102, and/or the activation energy parameters.

Figure 6:
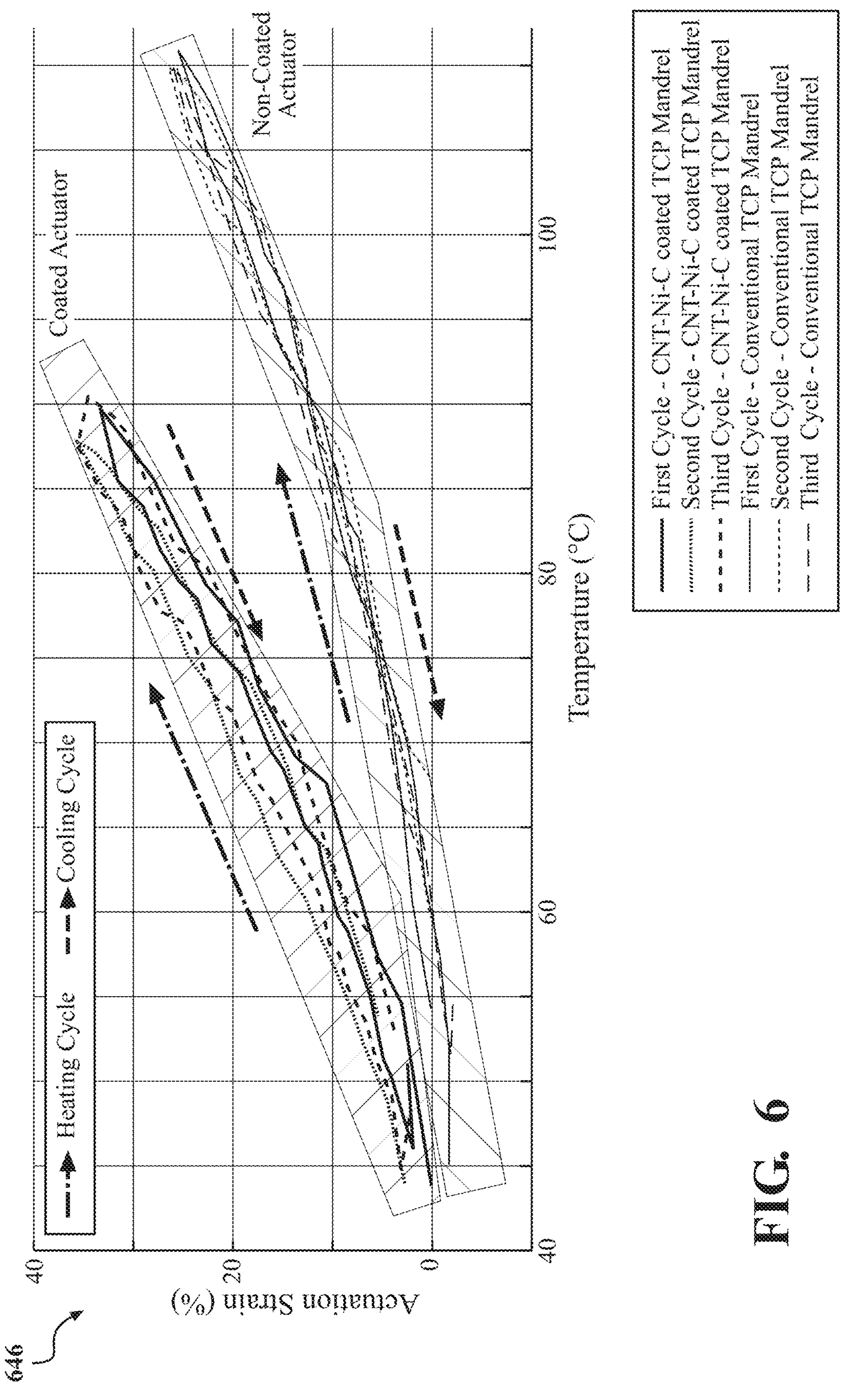
FIG. 6 is a graphical plot of thermal hysteresis (% tensile actuation as a function of heating and cooling) for an uncoated $TCP_{FL}^{RHW}$ actuator and a CNT-Ni—C-PVA coated $TCP_{FL}^{RHW}$ actuator.

FIG. 6 is a graphical plot 646 of thermal hysteresis (% tensile actuation as a function of heating and cooling) for an uncoated $TCP_{FL}^{RHW}$ actuator and a CNT-Ni—C-PVA coated $TCP_{FL}^{RHW}$ actuators 104 subjected to a 50-gram load. Specifically, FIG. 6 depicts three different load cycles of the coated $TCP_{FL}^{RHW}$ actuators 104 (via an input current of 0.27 A) and an uncoated $TCP_{FL}^{RHW}$ actuator (via an input current of 0.35 A) for 0.025 Hz. For each cycle, each actuator is energized (heated) for 12 seconds, followed by cooling for 28 seconds. The top part of each curve corresponds to the heating phase, and the bottom part of each curve corresponds to the cooling phase. As depicted in FIG. 6, the rise in temperature of the coated $TCP_{FL}^{RHW}$ actuator 104 is less than that of the uncoated $TCP_{FL}^{RHW}$ actuator. Yet the coated $TCP_{FL}^{RHW}$ actuator 104 actuation strain is more than that of the uncoated $TCP_{FL}^{RHW}$ actuator. That is, the actuation efficiency for lesser heat input is greater in the coated $TCP_{FL}^{RHW}$ actuator 104 than for an uncoated $TCP_{FL}^{RHW}$ actuator. This is due to the enhanced heat transfer provided by the coating 110. In addition, the hysteresis curves for the coated $TCP_{FL}^{RHW}$ actuator 104 are wider (i.e., 4% tensile actuation) than the hysteresis curves for the uncoated $TCP_{FL}^{RHW}$ actuator, thereby illustrating the enhanced cooling provided by the coating 110 on the coated $TCP_{FL}^{RHW}$ actuator 104.

Figure 7A:
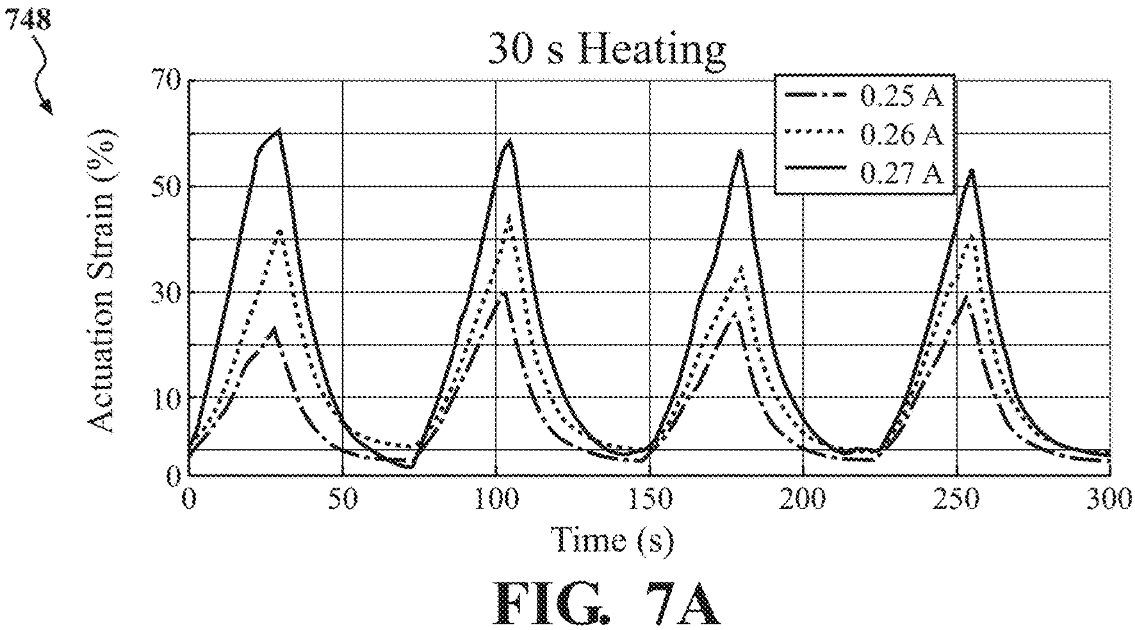
FIGS. 7A and 7B are graphical plots of the actuation strain of an elastomer skin over time based on different heating durations and with different activation energies.
Figure 7B:
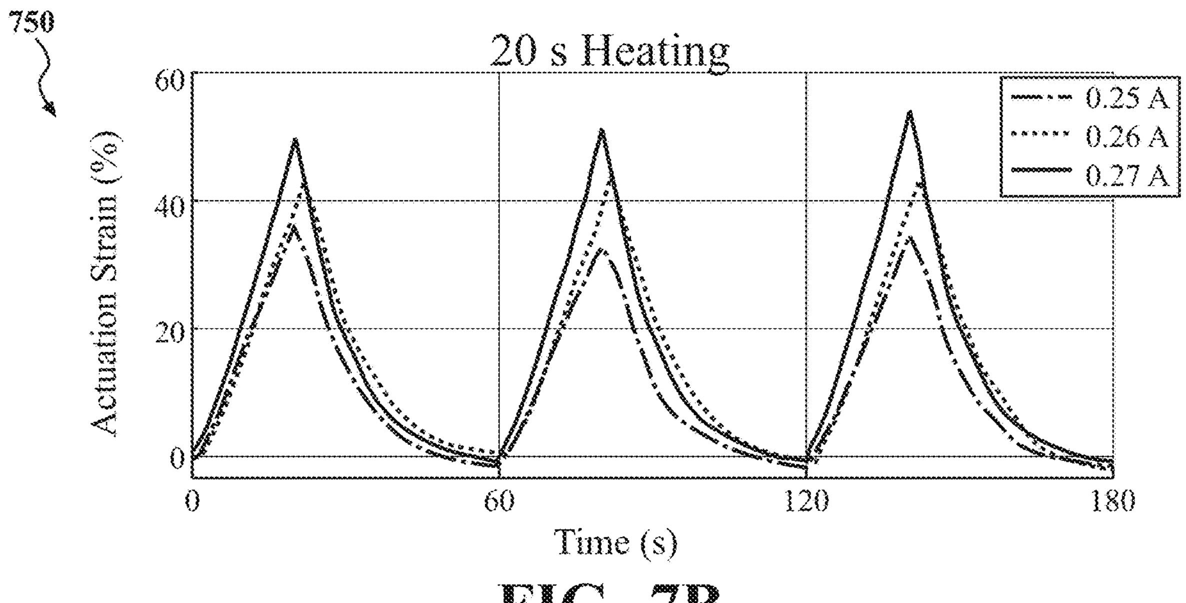

FIGS. 7A and 7B are graphical plots 748 and 750 of the actuation strain (% of loaded strength) of the elastomer skin 100 over time based on different heating durations and with different activation energies. Specifically, FIG. 7A is a graphical plot 748 of the actuation strain of the elastomer skin 100 at 0.013 Hz with a 30 second heating cycle followed by a 45 second cooling cycle for three different input currents (0.25 A, 0.26 A, 0.27 A) and a 100-gram load. FIG. 7B is a graphical plot 750 of the actuation strain of the elastomer skin 100 at 0.016 Hz with a 20 second heating cycle followed by a 40 second cooling cycle for three different input currents (0.25 A, 0.26 A, 0.27 A) and a 100-gram load. For the 30 second heating cycle at 0.27 A, the coated $TCP_{FL}^{RHW}$ actuator 104 exhibits about a 60% actuation strain provided at 1.99 MPa. The coated TCP RHW actuator 104 exhibited an actuation strain of about 54% for the 20 second heating cycle.

Figure 8A:
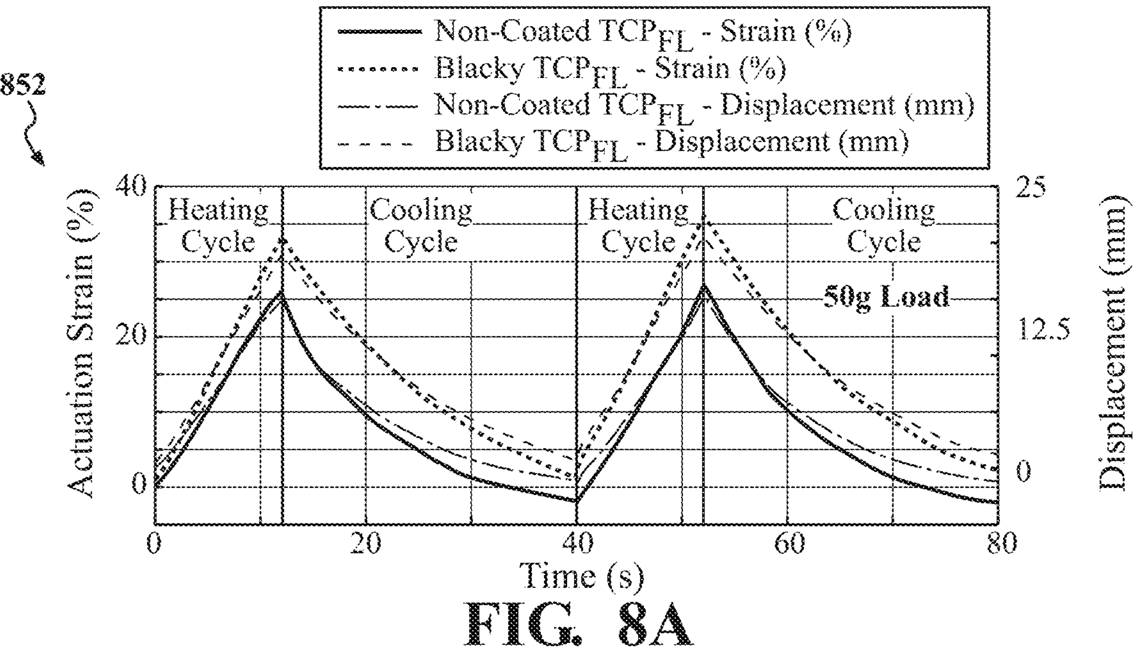
FIGS. 8A-8C are graphical plots of the dynamical performance for an uncoated $TCP_{FL}^{RHW}$ actuator and a CNT-Ni—C-PVA coated $TCP_{FL}^{RHW}$ actuator subjected to different loads and activation energies.
Figure 8B:
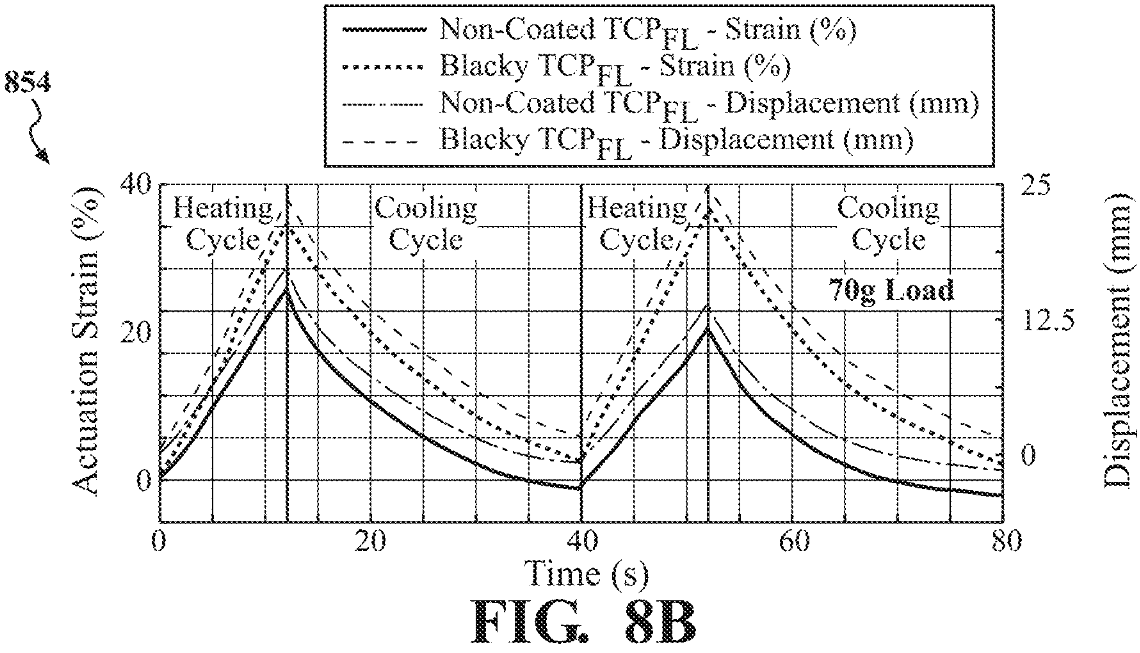
Figure 8C:
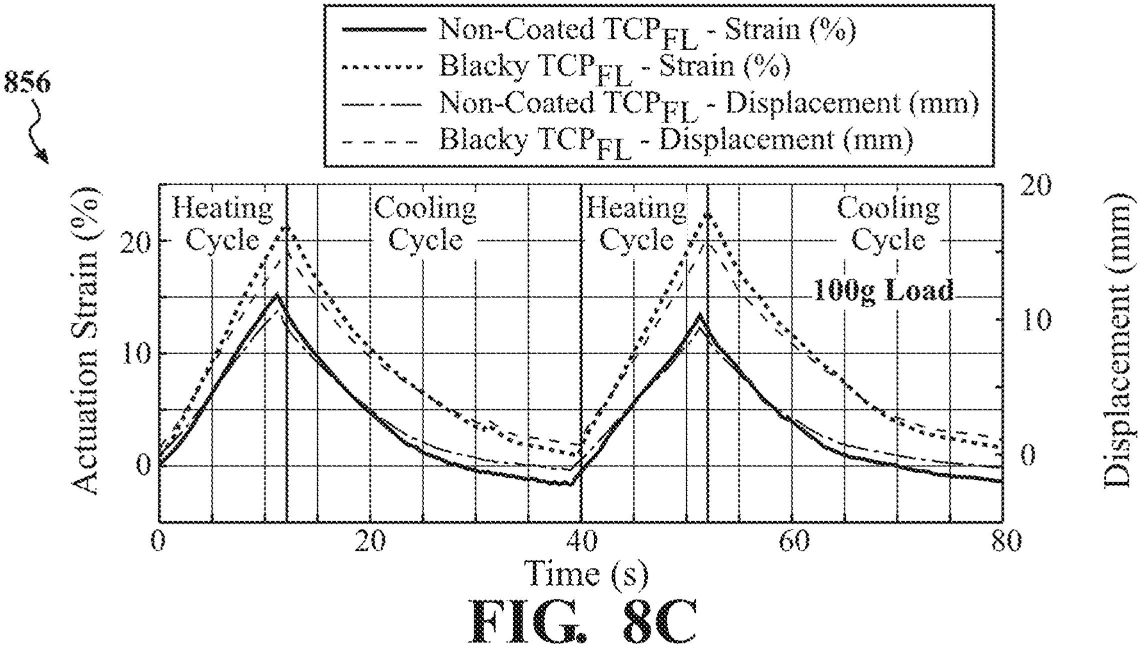

FIGS. 8A-8C are graphical plots 852, 854, and 856 of the dynamical performance for an uncoated $TCP_{FL}^{RHW}$ actuator and a CNT-Ni—C-PVA coated $TCP_{FL}^{RHW}$ actuator 104 subjected to different loads and activation energies. Specifically, FIG. 8A is a graphical plot 852 that depicts the dynamic actuation of the uncoated $TCP_{FL}^{RHW}$ actuator and CNT-Ni—C-PVA coated $TCP_{FL}^{RHW}$ actuator 104 under a 50-gram load, FIG. 8B is a graphical plot 854 that depicts the dynamic actuation of the uncoated $TCP_{FL}^{RHW}$ actuator and CNT-Ni—C-PVA coated $TCP_{FL}^{RHW}$ actuator 104 under a 70-gram load, and FIG. 8C is a graphical plot 856 that depicts the dynamic actuation of the uncoated $TCP_{FL}$ RHW actuator and CNT-Ni—C-PVA coated $TCP_{FL}^{RHW}$ actuator 104 under a 100-gram load. In each case, the uncoated $TCP_{FL}^{RHW}$ actuator and the coated $TCP_{FL}^{RHW}$ actuator 104 were energized with 4.9 W and 3.375 W of power, respectively, for 12 seconds, followed by cooling for 28 seconds (0.025 Hz).

Referring particularly to FIG. 8A, the coated $TCP_{FL}^{RHW}$ actuator 104 reached the maximum tensile strain value of the uncoated $TCP_{FL}^{RHW}$ actuator about 4 seconds faster when both actuators were under the 50-gram load. Also, for the 70-gram load (FIG. 8B), the coated $TCP_{FL}^{RHW}$ actuator 104 reached the maximum tensile strain value of the uncoated $TCP_{FL}^{RHW}$ actuator about 6 seconds faster, and for the 100-gram weight (FIG. 8C) the coated $TCP_{FL}^{RHW}$ actuator 104 reached the maximum tensile strain value of the uncoated $TCP_{FL}^{RHW}$ actuator about 5 seconds faster. Accordingly, the dynamic response of the coated $TCP_{FL}^{RHW}$ actuator 104 was between 4-6 seconds, or between 33 to 55%, faster than the uncoated $TCP_{FL}^{RHW}$ actuator. Accordingly, the coated $TCP_{FL}^{RHW}$ actuator 104 dynamically responds at least 25% faster than the uncoated $TCP_{FL}^{RHW}$ actuator.

In addition, FIGS. 8A-8C illustrate that the coated $TCP_{FL}^{RHW}$ actuator 104 exhibited between about 7.5-8% more actuation strain than the uncoated $TCP_{FL}^{RHW}$ actuator with about 31% less input power applied thereto. FIGS. 8A-8C also illustrate that the dynamic actuation of the coated $TCP_{FL}^{RHW}$ actuator 104 is greater than an uncoated $TCP_{FL}^{RHW}$ actuator during cooling with an actuation stroke increase of between 4-5%.

Figures 9, 10:
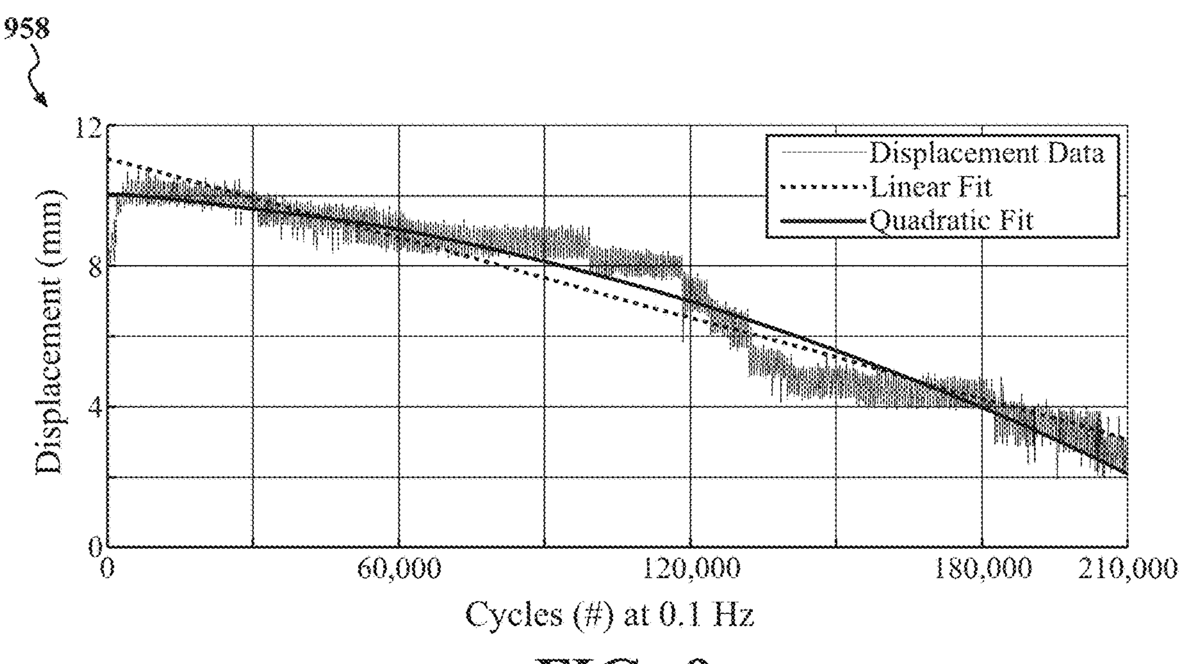
FIG. 9 is a graphical plot of a lifecycle test of a CNT-Ni—C-PVA coated $TCP_{FL}^{RHW}$ actuators.
FIG. 10 is a graphical plot of the actuation frequency vs. the average contractile strain per cycle of an uncoated $TCP_{FL}^{RHW}$ actuator and a CNT-Ni—C-PVA coated $TCP_{FL}^{RHW}$ actuator.

FIG. 9 is a graphical plot 958 of a CNT-Ni—C-PVA coated $TCP_{FL}^{RHW}$ actuator 104 lifecycle test. In this example, the coated $TCP_{FL}^{RHW}$ actuator 104 was driven at a pulsed input current of 0.27 A, 50% duty cycle, and an actuation frequency of 0.1 Hz (e.g., 5 seconds on and 5 seconds off) for 210,000 cycles. In an example, the degradation profiles of the coated $TCP_{FL}^{RHW}$ actuator 104 may be given by the following linear and quadratic fits, respectively:

$$y = -3.796*10^{-5}(x) + 11.05$$

$$y = -1.38*10^{-10}(x^2) - 9.028*10^{-6}(x) + 10.04$$

FIG. 10 is a graphical plot 1060 of the actuation frequency (Hz) vs. the average contractile strain per cycle (% of loaded length) of an uncoated $TCP_{FL}^{RHW}$ actuator and a CNT-Ni—C-PVA coated $TCP_{FL}^{RHW}$ actuator 104. As depicted in FIG. 10, actuation strain decreases as the actuation frequency increases as the heating time reduces. When operated at lower actuation frequencies (≤0.1 Hz), the $TCP_{FL}^{RHW}$ actuator 104 has increased actuation strain compared to an uncoated $TCP_{FL}^{RHW}$ actuator.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. The recitation of multiple forms or variations having stated features is not intended to exclude other forms or variations having additional features, or other forms or variations incorporating different combinations of the stated features. Various embodiments are shown in FIGS. 1A-10, but the embodiments are not limited to the illustrated structure or application.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should also be understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An elastomer skin, comprising:

an elastomer substrate; and a set of coated twisted and coiled polymer fishing line and resistance heating wire ($TCP_{FL}^{RHW}$) actuators embedded in the elastomer substrate:

the $TCP_{FL}^{RHW}$ actuators are unequally pre-loaded; and a coating of the coated $TCP_{FL}^{RHW}$ actuators comprises a mixture of carbon nanotubes, metal nanoparticles, and mesoporous carbon nanoparticles.

2. The elastomer skin of claim 1, further comprising electrical contacts at ends of the coated $TCP_{FL}^{RHW}$ actuators, an activation energy is applied through the electrical contacts, wherein the elastomer substrate twists due to different coated $TCP_{FL}^{RHW}$ actuators responding differently to the activation energy.

3. The elastomer skin of claim 2, wherein:

electrical contacts of a first coated $TCP_{FL}^{RHW}$ actuator receive a first activation energy; and electrical contacts of a second coated $TCP_{FL}^{RHW}$ actuator receive a second activation energy that is different than the first activation energy.

4. The elastomer skin of claim 1, wherein:

a twisted and coiled polymer fishing line of a first coated $TCP_{FL}^{RHW}$ actuator has a first diameter; and a twisted and coiled polymer fishing line of a second coated $TCP_{FL}^{RHW}$ actuator has a second diameter that is different than the first diameter.

5. The elastomer skin of claim 1, wherein:

a first coated $TCP_{FL}^{RHW}$ actuator within the elastomer substrate has a first longitudinal strain; and a second coated $TCP_{FL}^{RHW}$ actuator within the elastomer substrate has a second longitudinal strain that is different than the first longitudinal strain.

6. The elastomer skin of claim 1, wherein:

a first coated $TCP_{FL}^{RHW}$ actuator has a first unstretched length; and a second coated $TCP_{FL}^{RHW}$ actuator has a second unstretched length that is different than the first unstretched length.

7. The elastomer skin of claim 1, wherein the set of coated $TCP_{FL}^{RHW}$ actuators are sequentially arranged in the elastomer substrate based on an associated pre-load.

8. The elastomer skin of claim 1, wherein a height of the elastomer substrate varies across a width of the elastomer substrate.

9. The elastomer skin of claim 1, wherein the metal nanoparticles comprise nickel nanoparticles.

10. The elastomer skin of claim 1, wherein:

the coating further comprises a polymer matrix; and the carbon nanotubes, the metal nanoparticles, and the mesoporous carbon nanoparticles are dispersed in the polymer matrix.

11. The elastomer skin of claim 10, wherein the coating has a composition of:

between 5.0 wt. % and 15.0 wt. % carbon nanotubes;

between 5.0 wt. % and 15.0 wt. % metal nanoparticles;

between 30.0 wt. % and 50.0 wt. % mesoporous carbon nanoparticles; and between 30.0 wt. % and 50.0 wt. % polymer matrix.

12. An elastomer skin, comprising:

an elastomer substrate; and a set of coated twisted and coiled polymer fishing line and resistance heating wire ($TCP_{FL}^{RHW}$) actuators embedded in the elastomer substrate:

the $TCP_{FL}^{RHW}$ actuators are unequally pre-loaded; and a coating of the coated $TCP_{FL}^{RHW}$ actuators comprises a mixture of carbon nanotubes, metal nanoparticles, and mesoporous carbon nanoparticles dispersed within a polymer matrix.

13. The elastomer skin of claim 12, wherein the polymer matrix comprises a polyvinyl alcohol.

14. The elastomer skin of claim 12, further comprising electrical contacts at ends of the coated $TCP_{FL}^{RHW}$ actuators, an activation energy is applied through the electrical contacts, wherein the elastomer substrate twists due to different coated $TCP_{FL}^{RHW}$ actuators responding differently to the activation energy.

15. The elastomer skin of claim 14, wherein:

electrical contacts of a first coated $TCP_{FL}^{RHW}$ actuator receive a first activation energy; and electrical contacts of a second coated $TCP_{FL}^{RHW}$ actuator receive a second activation energy that is different than the first activation energy.

16. The elastomer skin of claim 12, wherein:

a first coated $TCP_{FL}^{RHW}$ actuator has a first unstretched length; and a second coated $TCP_{FL}^{RHW}$ actuator has a second unstretched length that is different than the first unstretched length.

17. The elastomer skin of claim 12, wherein a height of the elastomer substrate varies across a width of the elastomer substrate.

18. An elastomer skin, comprising:

an elastomer substrate; and a set of coated twisted and coiled polymer fishing line and resistance heating wire ($TCP_{FL}^{RHW}$) actuators embedded in the elastomer substrate:

the $TCP_{FL}^{RHW}$ actuators are unequally pre-loaded; and a coating of the coated $TCP_{FL}^{RHW}$ actuators comprises a mixture of carbon nanotubes, metal nanoparticles, and mesoporous carbon nanoparticles dispersed within a polymer matrix with a composition of between 5.0 wt. % and 15.0 wt. % carbon nanotubes, between 5.0 wt. % and 15.0 wt. % metal nanoparticles, between 30.0 wt. % and 50.0 wt. % mesoporous carbon nanoparticles, and between 30.0 wt. % and 50.0 wt. % polymer matrix.

19. The elastomer skin of claim 18, further comprising electrical contacts at ends of the coated $TCP_{FL}^{RHW}$ actuators, an activation energy is applied through the electrical contacts, wherein the elastomer substrate twists due to different coated $TCP_{FL}^{RHW}$ actuators responding differently to the activation energy.

20. The elastomer skin of claim 18, wherein:

a first coated $TCP_{FL}^{RHW}$ actuator within the elastomer substrate has a first longitudinal strain; and a second coated $TCP_{FL}^{RHW}$ actuator within the elastomer substrate has a second longitudinal strain that is different than the first longitudinal strain.

* * * * *